United States Patent
Borinato

(10) Patent No.: US 11,287,821 B2
(45) Date of Patent: Mar. 29, 2022

(54) AUTONOMOUS WORKING SYSTEM, AN AUTONOMOUS VEHICLE AND A TURNING METHOD THEREOF

(71) Applicant: Gianni Borinato, Schio (IT)

(72) Inventor: Gianni Borinato, Schio (IT)

(73) Assignee: Positec Power Tools (Suzhou) Co., Ltd., Jiangsu (CN)

( * ) Notice: Subject to any disclaimer, the term of this patent is extended or adjusted under 35 U.S.C. 154(b) by 785 days.

(21) Appl. No.: 15/972,013

(22) Filed: May 4, 2018

(65) Prior Publication Data
US 2018/0253098 A1 Sep. 6, 2018

Related U.S. Application Data

(63) Continuation of application No. 14/114,402, filed as application No. PCT/CN2012/074845 on Apr. 27, 2012, now Pat. No. 9,983,586.

(30) Foreign Application Priority Data

Apr. 28, 2011 (CN) .......................... 201110109287.8

(51) Int. Cl.
*G05D 1/02* (2020.01)
*A01D 34/00* (2006.01)
(52) U.S. Cl.
CPC ............ *G05D 1/021* (2013.01); *A01D 34/008* (2013.01); *G05D 1/0265* (2013.01); *G05D 2201/0215* (2013.01); *Y10S 901/01* (2013.01)
(58) Field of Classification Search
None
See application file for complete search history.

(56) References Cited

U.S. PATENT DOCUMENTS 3,128,840 A    4/1964   Barrett
3,498,403 A    3/1970   Kohls
(Continued)

FOREIGN PATENT DOCUMENTS

CN   1659489    8/2005
CN   1678133    10/2005
(Continued)

OTHER PUBLICATIONS

Omslag Indd: "Husqvarna Automower R 230 ACX/220 AC Operator's Manuel", Dec. 31, 2010 (Dec. 31, 2020) XP055483756, Retrieved from the Internet: URL:http://www.husqvarna.com/ddoc/HUSO/HUS02015_USen/HUS02015_USen_1157066-95; (77pages).

*Primary Examiner* — David P. Merlino
(74) *Attorney, Agent, or Firm* — Dentons US LLP

(57) ABSTRACT

Disclosed in the present invention is an autonomous vehicle (1), which comprises an housing (21), an driving module mounted on the housing (21), an borderline detecting module mounted on the housing for detecting the distance between the autonomous vehicle (1) and the borderline (3), an energy module mounted on the housing for providing energy for the autonomous vehicle, and an control module electrically connected with the driving module and the borderline detecting module. The control module controls the driving module to perform steering based on the signal representing the angle relationship between the autonomous vehicle (1) and the borderline (3) transmitted from the borderline detecting module, so that the axis (33) of the autonomous vehicle (1) always forms an acute angle or an right angle with one side of the borderline (3) while steering is completed, but another side of the borderline (3) forms an acute angle or an right angle with the core axis (33) of the autonomous vehicle (1) when the turning begins. The turning has directivity, so that the autonomous vehicle more easily goes out from the narrow area and the efficiency of (Continued)

area covering is higher; moving is kept during the turning, so that the energy is saved, and the working efficiency is improved.

20 Claims, 6 Drawing Sheets

(56) References Cited

U.S. PATENT DOCUMENTS

| | | |
|---|---|---|
| 3,550,714 A | 12/1970 | Bellinger |
| 3,698,523 A | 10/1972 | Bellinger |
| 3,713,505 A | 1/1973 | Muller |
| 3,893,536 A | 7/1975 | Marshall et al. |
| 5,024,814 A | 6/1991 | Futatasuka et al. |
| 5,083,629 A | 1/1992 | Chang |
| 5,323,593 A * | 6/1994 | Cline .................. A01D 34/008 136/291 |
| 5,942,869 A | 8/1999 | Katou et al. |
| 6,300,737 B1 | 10/2001 | Bergvall et al. |
| 6,615,108 B1 | 9/2003 | Peless et al. |
| 7,288,912 B2 | 10/2007 | Landry et al. |
| 7,574,282 B2 | 8/2009 | Petersson et al. |
| 2002/0165648 A1 | 11/2002 | Zeitler |
| 2003/0208304 A1 | 11/2003 | Peless et al. |
| 2005/0231068 A1 | 10/2005 | Tokumaru et al. |
| 2005/0251292 A1 | 11/2005 | Casey et al. |
| 2006/0079997 A1 | 4/2006 | McLurkin et al. |
| 2008/0183349 A1 | 7/2008 | Abramson et al. |
| 2009/0254218 A1 | 10/2009 | Sandin et al. |
| 2012/0065829 A1 | 3/2012 | Yu et al. |
| 2013/0345922 A1 * | 12/2013 | Biber .................. G05D 1/0219 701/25 |

FOREIGN PATENT DOCUMENTS

| | | |
|---|---|---|
| CN | 1690902 | 11/2005 |
| CN | 1773219 | 5/2006 |
| CN | 102039595 | 5/2011 |
| CN | 102768533 | 11/2012 |
| CN | 103376801 | 10/2013 |
| DE | 102007053310 | 6/2009 |
| EP | 1933467 | 6/2008 |
| EP | 1933467 A2 | 6/2008 |
| JP | H08161048 | 6/1996 |
| JP | 09179625 A * | 7/1997 |
| JP | H11195127 | 7/1999 |
| WO | 2004025947 | 3/2004 |
| WO | 2006089307 | 8/2006 |
| WO | 2006089307 A2 | 8/2006 |
| WO | 2007109624 | 9/2007 |
| WO | 2007109624 A2 | 9/2007 |

* cited by examiner

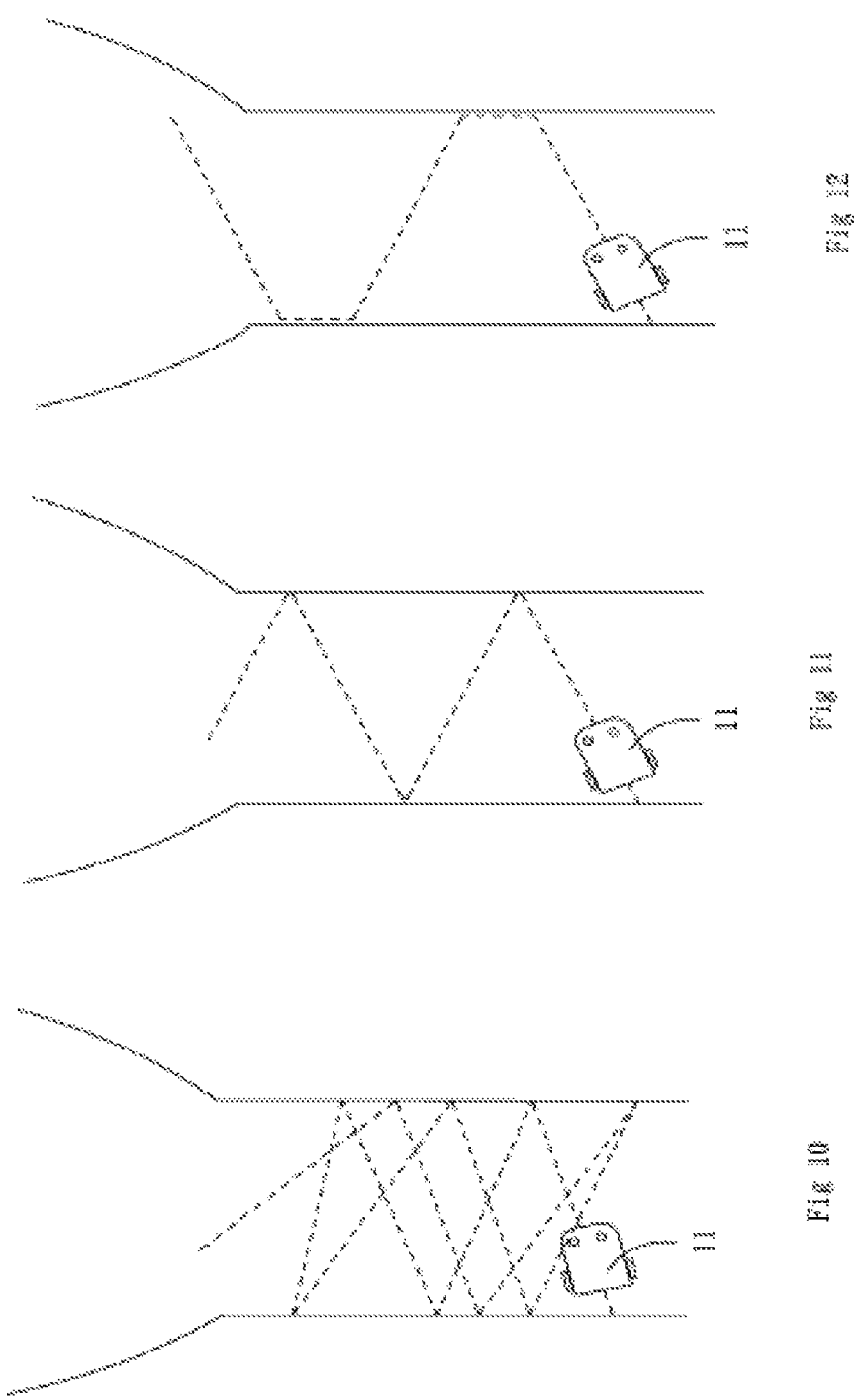

AUTONOMOUS WORKING SYSTEM, AN AUTONOMOUS VEHICLE AND A TURNING METHOD THEREOF

This application is a continuation of U.S. application Ser. No. 14/114,402, filed on Oct. 28, 2013, which is the National Stage of International Application No. PCT/CN2012/074845 filed on Apr. 27, 2012, which claims priority to and the benefit of Chinese Patent Application No. 201110109287.8, filed on Apr. 28, 2011, all-of which are incorporated herein in their entirety by reference for all purposes as if fully set forth herein.

TECHNICAL FIELD

The present invention relates to the field of smart control, in particular to an autonomous vehicle, an autonomous working system and a turning method for the autonomous vehicle.

DESCRIPTION OF THE RELATED ART

Along with the continuous development of the computer technology and artificial intelligence technology, autonomous working systems similar to the intelligent robots have slowly enter people's life. Sumsung, Electrolux, and other company have both developed fully autonomous dust collectors and put into the market. Those fully autonomous dust collectors are usually small and integrated with an environment sensor, a self-driving system, a dust collection system, a battery and a charging system, can autonomously cruise in the room without operation by people, return to the dock to be docked and charged when the power level is low, and then continue to cruise collector dust. Meanwhile, Husqvarna AB and other companies have developed the similar robot mowers capable of autonomously cutting grasses on the lawn and charging without inference by users. Those autonomous working systems need no management after one-time setup, so users are deliberated from tedious time-and-energy-consuming houseworks such as cleaning and lawn maintenance and therefore are well welcome.

Those autonomous working systems all need precise cooperation of a plurality of systems and technologies during normal working, and path planning is one of the key technologies. The path planning technology is used for guiding the autonomous vehicle to select the path to move in the working scope. Path planning needs to reduce the repeated moving time and cover the working area as much as possible, and also need to cope with various complicated terrain and leave away smoothly while keeping a coverage rate in narrow areas, dead corners or obstacle areas. It can be said that path planning directly determines the working efficiency of the autonomous vehicle. Poor path planning results in problems when the autonomous vehicle is working, such as insufficient coverage scope, dead corner, long time for covering the whole working scope, or being captured in some special terrains.

At present, coverage and smoothly passing the narrow areas or dead corners are the major technical problems encountered by path planning of the autonomous vehicle. The majority of the commercial autonomous working systems all adopt random paths during moving, namely moving straightly in the working scope, brake and stop moving first when encountering obstacles, make a turn randomly or according to a predetermined program, and then start to move away. The autonomous working devices can only sense that they encounter an obstacle or a border, cannot know the original moving direction thereof and the accurate position in the working area, fail to rationally judge which direction of turn is the optical scheme, therefore move randomly in a narrow area and need a long time to leave the area, and even fail to leave the area. Meanwhile, because of failing to judge the direction of turn in the next step, the autonomous working devices are required to stop moving and then make a turn instead of directly making a turn. Moreover, the working area of the household autonomous working devices is not big, and the autonomous working devices can quickly move from one end to the other end and therefore need starting and stopping frequently in the whole working process. Those autonomous vehicles cannot move continuously and waste a lot of time on stop and startup, thereby reducing the overall moving speed, lowering the working efficiency, increasing the mechanical wear of the autonomous vehicle and shortening the service life.

SUMMARY OF THE INVENTION

The aim of the present invention is to provide an autonomous vehicle which selects the turning path rationally and efficiently, a rational and highly efficient turning method of an autonomous vehicle, and an autonomous working system for the autonomous vehicle. The present invention provides an autonomous vehicle for moving and working in a working scope limited by the limit, comprising: a housing having a longitudinal central axis; a driving module mounted on said housing, said driving module drives said autonomous vehicle to move and make a turn, and comprises a wheel set and a driving motor for driving the wheel set to move; a limit detecting module mounted on said housing for detecting a location relationship between said autonomous vehicle and said limit, an energy module mounted on the housing for providing energy for said autonomous vehicle, and an control module electrically connected with said driving module and said limit detecting module; wherein: said control module controls said driving module to perform turning based on a signal representing said angle relationship between said autonomous vehicle and said limit transmitted from said limit detecting module, so that said central axis of said autonomous vehicle always forms an acute angle or a right angle with one side of said limit when said turn is completed, but another side of said limit forms an acute angle or a right angle with said central axis said the autonomous vehicle when said turn begins.

Preferably, said driving module drives said autonomous vehicle to make a turn in a direction where the acute angle or right angle between the central axis or limit is reduced.

Preferably, the angle of said turn is less than 180 degrees.

Preferably, the angle of said turn is greater than or equal to 90 degrees.

Preferably, said limit detecting module comprises border sensing elements respectively located on the two sides of said central axis of said housing.

Preferably, said border sensing elements are arranged symmetrically with respect to said central axis.

Preferably, said border sensing elements located on the front portion of said housing.

Preferably, said border sensing elements are inductors.

Preferably, said predetermined location relationship is that one of said border sensing elements reaches a predetermined distance from said limit.

Preferably, said predetermined location relationship is that one of said border sensing elements is outside of said limit.

Preferably, the angle relationship is that the angle between said central axis and any side of the limit starting from the intersection point of the central axis and said limit is a right angle or an acute angle or an obtuse angle.

Preferably, said limit detecting module comprises border sensing elements respectively located on the two sides of the central axis of the housing; when a border sensing element on one side sends a signal to said control module representing that it reaches a predetermined distance to said limit, said control module determines that said limit located on one side of the central axis forms an acute angle with said central axis.

Preferably, said limit detecting module comprises border sensing elements respectively located on the two sides of said central axis of said housing, when a border sensing element at one side send a signal to said control module representing that it is outside of said limit first, said control module determine that said limit located at said one side of said central axis forms an acute angle with said central axis.

Preferably, said angle relationship is that the angle value between said central axis and any one of the two side start from the intersection of said central axis and the limit.

Preferably, said limit detecting module comprises border sensing elements respectively located on the two sides of said central axis of said housing, said control module records a move distance of said autonomous vehicle in the time interval between said border sensing elements respectively sending a signal representing that it reach a predetermined distance from said limit, and calculates the angle between said central axis and said border.

Preferably, said limit detecting module comprises border sensing elements respectively located on the two sides of said central axis of said housing, said control module records a move distance of said autonomous vehicle in the time interval between said border sensing elements respectively sending a signal representing that it is out of said limit, and calculates an angle between said central axis and said border.

Preferably, the autonomous vehicle is a robot mover, also comprising a cutting assembly located below the housing and a cutting motor driving the cutting assembly.

Preferably, the autonomous vehicle keeps moving from moving towards the limit and reaching the predetermined location relationship to completing the turn.

Preferably, the autonomous vehicle moves by a distance along the limit after the turn begins and before the turn is completed.

The present invention also discloses an autonomous working system, comprising a limit for limiting the working scope of the autonomous working system, and also comprising the mentioned autonomous vehicle.

Preferably, the limit comprises a border line signal generating element and a border line in connection with the border line signal generating element. The border line signal generating element sends periodical current signals to the border line.

The present invention also discloses a turning method of an autonomous vehicle. The autonomous vehicle is used for moving and working in a working scope limited by the limit. The turning method comprises the following steps: the autonomous vehicle moves to the limit; the autonomous vehicle detects the location relationship with the limit; when reaching a predetermined location relationship with the limit, the autonomous vehicle detects the angle relationship with the limit, wherein the limit is divided into two sides start from the intersection of the axis; the autonomous vehicle makes a turn to move away from the limit so that the axis of the autonomous vehicle forms an acute angle or a right angle with one side of the border line while the turn is completed, but the other side of the limit forms an acute angle or a right angle with the axis of the autonomous vehicle when the turn begins.

Preferably, the autonomous vehicle makes a turn to the direction wherein the acute angle or right angle between the axis and the limit is reduced.

Preferably, the autonomous vehicle moves by a distance along the limit after the turn begins and before the turn is completed.

Preferably, the autonomous vehicle moves by a predetermined time or predetermined distance along the limit after the turn begins and before the turn is completed.

Preferably, the predetermined distance is between 20 cm and 100 cm.

Preferably, the autonomous vehicle has border sensing elements respectively on the two sides of the axis, said predetermined location relationship is that one of the border sensing elements reaches a predetermined distance from the limit, said method sensing the angle relationship between the autonomous vehicle and the limit further comprises the following steps: the border sensing element on one side of the autonomous vehicle sends a collision signal to the control module of the autonomous vehicle after sensing that it reaches the predetermined distance; the border sensing element on the other side of the autonomous vehicle sends a collision signal to the control module of the autonomous vehicle after sensing that it reaches the predetermined distance; and the control module judges that the side on which the border sensing element senses that it reaches the predetermined distance first forms an acute angle with the limit.

Preferably, said autonomous vehicle has border sensing elements respectively on the two sides of said central axis, said predetermined location relationship is that one of said border sensing elements is outside of said limit, said step sensing the angle relationship between said autonomous vehicle and said limit further comprises following steps: said border sensing element on one side of said autonomous vehicle sends a collision signal to a control module of said autonomous vehicle when sensing that it is outside of said limit; said border sensing element on the other side of the autonomous vehicle sends a collision signal to said control module of said autonomous vehicle when sensing that it is outside of said limit; said control module judges that the side on which said border sensing element senses that it is outside of said limit first forms an acute angle with said limit.

Preferably, said autonomous vehicle has border sensing elements respectively on the two sides of said central axis, said predetermined location relationship is that one of said border sensing elements reaches a predetermined distance, said step sensing the angle relationship between said autonomous vehicle and said limit further comprises following steps: said border sensing element on one side of said autonomous vehicle detects that it reaches said predetermined distance first sends a collision signal to a control module of said autonomous vehicle; said autonomous vehicle keeps moving, said border sensing element on the other side of the autonomous vehicle sends a collision signal to said control module of said autonomous vehicle when sensing that it reaches said predetermined distance; sensing the moving distance of the autonomous device in the time that the two border sensing elements reach the predetermined distance successively; calculating the value of included angle between said central axis of the autonomous vehicle and said limit according to the moving distance and the distance between two border sensing elements when reaching said predetermined distance.

Preferably, said autonomous vehicle has border sensing elements respectively on the two sides of said central axis, said predetermined location relationship is that one of said border sensing elements is outside of said limit, said step sensing the angle relationship between said autonomous vehicle and said limit further comprises following steps: said border sensing element on one side of said autonomous vehicle detects that it is outside of said limit first sends a collision signal to a control module of said autonomous vehicle; said autonomous vehicle keeps moving, said border sensing element on the other side of the autonomous vehicle sends a collision signal to said control module of said autonomous vehicle when sensing that it is outside of said limit; sensing a moving distance of said autonomous vehicle in the time that said two border sensing elements is outside of said limit successively; calculating the value of included angle between said central axis of said autonomous vehicle and said limit according to the moving distance and the distance between two border sensing elements when is outside of said limit.

Preferably, the angle of said turn is greater than or equal to 90 degrees, less than 180 degrees.

The present invention also provides an autonomous vehicle for moving and working in a working scope limited by the limit, comprising a housing, a driving module, a limit detecting module, an energy module and a control module, wherein the housing has a longitudinal axis; the driving module is mounted on the housing, drives the autonomous vehicle to move and make a turn, and comprises a wheel set and a driving motor for driving the wheel set to move; the limit detecting module detects the location relationship between the autonomous vehicle and the limit; the energy module is mounted on the housing for providing energy for the autonomous vehicle; and the control module is electrically connected with the driving module and the limit detecting module. The autonomous vehicle makes a turn to moves away from the limit after moving towards the limit and reaching a predetermined location relationship. In the predetermined location relationship, the limit is divided into two sides by the point of intersection with the central axis. The control module drives the driving module to perform turning based on the signal representing the angle relationship between the autonomous vehicle and the limit from the limit detecting module, so that the driving module drives the autonomous vehicle to make a turn in a direction where the acute angle or right angle between the central axis or limit is reduced.

Preferably, the central axis of the autonomous vehicle always forms an acute angle or a right angle with one side of the limit when the turn is completed, and the other side of the limit forms an acute angle or right angle with the central axis of the autonomous vehicle when the turns begins.

The present invention also provides a turning method of an autonomous vehicle. The autonomous vehicle is used for moving and working in a working scope limited by the limit. The turning method comprises the following steps: the autonomous vehicle drives to the limit; the autonomous vehicle detects the location relationship between it and the limit; the autonomous vehicle detects the angle relationship with the limit when the autonomous vehicle and the limit reach a predetermined location relationship; and the autonomous working device make a turn in the direction where the acute angle or right angle between the central axis and the limit is reduced.

Preferably, the limit is divided into two sides by the point of intersection with the central axis when the autonomous vehicle and the limit reach a predetermined location relationship; the central axis of the autonomous vehicle always form an acute angle or a right angle with one side of the limit when the turn is completed, while the other side of the limit forms an acute angle or right angle with the central axis of the autonomous vehicle when the turn begins.

The present invention also provides an autonomous vehicle for moving and working in a working scope limited by the limit, comprising a housing, a driving module, a limit detecting module, an energy module and a control module, wherein the housing has a longitudinal axis and is divided into two sides by the central axis, namely left side and right side; the driving module is mounted on the housing, drives the autonomous vehicle to move and make a turn, and comprises a wheel set and a driving motor for driving the wheel set to move; the limit detecting module detects the location relationship between the autonomous vehicle and the limit; the energy module is mounted on the housing for providing energy for the autonomous vehicle; and the control module is electrically connected with the driving module and the limit detecting module. The autonomous vehicle makes a turn to moves away from the limit after moving towards the limit and reaching a predetermined location relationship. When the autonomous vehicle reaches the predetermined location relationship, the control module drives the driving module to perform turning based on the signal transmitted from the limit detecting module that represents one side of the autonomous vehicle closer to the limit, so that the distance from one side of the autonomous vehicle to the limit is always smaller than that from the other side to the limit.

Preferably, the autonomous vehicle makes a turn clockwise if the left side is closer to the limit when reaching the predetermined location relationship; and the autonomous vehicle makes a turn anticlockwise if the right side is closer to the limit.

Preferably, the angle of said turn is greater than or equal to 90 degrees, less than 180 degrees.

Preferably, said limit detecting module comprises border sensing elements respectively located on the two sides of the central axis of the housing.

Preferably, said border sensing elements are arranged symmetrically with respect to said central axis, located on the front portion of said housing.

Preferably, said predetermined location relationship is that one of the border sensing elements reaches a predetermined distance from the limit.

Preferably, said predetermined location relationship is that one of said border sensing elements is outside of said limit.

Preferably, when a border sensing element at one side send a signal to said control module representing that it reach a predetermined distance from said limit first, the control module determine that said one side is closer to said limit.

Preferably, when a border sensing element at one side send a signal to said control module representing that it is out of the limit first, the control module determine that said one side is closer to said limit.

Preferably, the autonomous vehicle is a robot mover, also comprising a cutting unit located below the housing and a cutting motor driving the cutting unit to cut.

Preferably, the autonomous vehicle keeps moving from moving towards the limit and reaching the predetermined location relationship to completing the turn.

Preferably, the autonomous vehicle moves by a distance along the limit after the turn begins and before the turn is completed.

The present invention also provides an autonomous working system, comprising a limit for limiting the working scope of the autonomous working system, and also comprising the mentioned autonomous vehicle.

Preferably, the limit comprises a border line signal generating element and a border line in connection with the border line signal generating element. The border line signal generating element sends periodical current signals to the border line.

The present invention also provides a turning method of an autonomous vehicle. The autonomous vehicle has a central axis which divides the autonomous vehicle into two sides, namely left side and right side. The turning method comprises the following steps: the autonomous vehicle moves towards the limit; the autonomous vehicle monitors the location relationship with the limit; the autonomous vehicle judges which side is closer to the limit when reaching a predetermined location relationship; the autonomous vehicle makes a turn and moves away from the limit, so that the distance from one side of the autonomous vehicle to the limit is always smaller to that from the other side to the limit, while one side is closer to the limit when the turn begins.

Preferably, when reaching the predetermined location relationship, the autonomous vehicle makes a turn clockwise if the left side is closer to the limit and makes a turn anticlockwise if the right side is closer to the limit.

Preferably, the autonomous vehicle moves by a distance along the limit after the turn begins and before the turn is completed.

Preferably, the autonomous vehicle moves by a predetermined time or predetermined distance along the limit after the turn begins and before the turn is completed.

Preferably, the angle of said turn is greater than or equal to 90 degrees, less than 180 degrees.

Preferably, the autonomous vehicle has border sensing elements respectively on the two sides of the axis, said predetermined location relationship is that one of the border sensing elements reaches a predetermined distance from the limit.

Preferably, the step that the autonomous vehicle judges which side is closer to the limit comprises: when a border sensing element at one side send a signal to said control module representing that it reach a predetermined distance from said limit first, the control module determine that said one side is closer to said limit.

Preferably, said autonomous vehicle has border sensing elements respectively on the two sides of said central axis, said predetermined location relationship is that one of said border sensing elements is outside of said limit.

Preferably, the step that the autonomous vehicle judges which side is closer to the limit comprises: when a border sensing element at one side send a signal to said control module representing that it is outside of said limit first, the control module determine that said one side is closer to said limit.

The present invention also provides an autonomous vehicle for moving and working in a working scope limited by the limit, comprising a housing, a driving module, a limit detecting module, an energy module and a control module, wherein the housing has a longitudinal axis and is divided into two sides by the central axis, namely left side and right side; the driving module is mounted on the housing, drives the autonomous vehicle to move and make a turn, and comprises a wheel set and a driving motor for driving the wheel set to move; the limit detecting module detects the location relationship between the autonomous vehicle and the limit; the energy module is mounted on the housing for providing energy for the autonomous vehicle; and the control module is electrically connected with the driving module and the limit detecting module. The autonomous vehicle makes a turn to moves away from the limit after moving towards the limit and reaching a predetermined location relationship. When the autonomous vehicle reaches the predetermined location relationship, the control module drives the driving module to perform turning based on the signal transmitted from the limit detecting module that represents one side of the autonomous vehicle closer to the limit, the autonomous vehicle makes a turn clockwise if the left side is closer to the limit when reaching the predetermined location relationship; and the autonomous vehicle makes a turn anticlockwise if the right side is closer to the limit.

Preferably, when the turn is completed, the distance from one side of the autonomous vehicle to the limit is always smaller than that from the other side to the limit.

The present invention also provides a turning method of an autonomous vehicle. The autonomous vehicle has a central axis which divides the autonomous vehicle into two sides, namely left side and right side. The turning method comprises the following steps: the autonomous vehicle moves towards the limit; the autonomous vehicle monitors the location relationship with the limit; the autonomous vehicle judges which side is closer to the limit when reaching a predetermined location relationship; the autonomous vehicle makes a turn and moves away from the limit, the autonomous vehicle makes a turn clockwise if the left side is closer to the limit when reaching the predetermined location relationship; and the autonomous vehicle makes a turn anticlockwise if the right side is closer to the limit.

Preferably, when the turn is completed, the distance from one side of the autonomous vehicle to the limit is always smaller to that from the other side to the limit, while one side is closer to the limit when the turn begins.

The present invention also provides an autonomous vehicle for moving and working in a working scope limited by the limit, comprising a housing, a driving module, a limit detecting module, an energy module and a control module, wherein the housing has a longitudinal axis and is divided into two sides by the central axis, namely left side and right side; the driving module is mounted on the housing, drives the autonomous vehicle to move and make a turn, and comprises a wheel set and a driving motor for driving the wheel set to move; the limit detecting module detects the location relationship between the autonomous vehicle and the limit; the energy module is mounted on the housing for providing energy for the autonomous vehicle; and the control module is electrically connected with the driving module and the limit detecting module. Said autonomous vehicle receives the signal representing said location relationship between said autonomous vehicle and said limit from said limit detecting module, said control module controls the driving module to make a turn to leave said limit, said autonomous vehicle keeps moving from moving towards the limit and reaching the predetermined location relationship to completing the turn.

Preferably, the driving motor drives the driving wheel to move continuously from that the autonomous vehicle and the limit reach the predetermined location to that the turn is completed.

Preferably, the control module controls the driving module to perform turning based on the signal representing the angle relationship between the autonomous vehicle and the limit transmitted from the limit detecting module, so that the central axis of the autonomous vehicle always form an acute angle or a right angle with one side of the limit when the turn is completed, while the other side of the limit forms an acute angle or right angle with the central axis of the autonomous vehicle when the turn begins.

Preferably, the control module controls the driving module to perform turning based on the signal representing the angle relationship between the autonomous vehicle and the limit transmitted from the limit detecting module, and the driving module makes a turn towards the direction where the acute angle or right angle formed by the axis and the limit is reduced.

Preferably, the angle relationship is that the angle between the central axis and the central axis and any side of the limit starting from the intersection point of the central axis and the limit is an right angle or an acute angle or an obtuse angle.

Preferably, the limit detecting module comprises border sensing elements respectively located on the two sides of the central axis of the housing; after a border sensing element on one side sends a signal to the control module representing that it reaches a predetermined distance to the limit, the control module determines that the limit located on one side of the central axis forms an acute angle with the central axis.

Preferably, said limit detecting module comprises border sensing elements respectively located on the two sides of said central axis of said housing, when a border sensing element at one side send a signal to said control module representing that it is outside of said limit first, said control module determine that said limit located at said one side of said central axis forms an acute angle with said central axis.

Preferably, said angle relationship is that the angle value between said central axis and any one of the two side start from the intersection of said central axis and the limit.

Preferably, said limit detecting module comprises border sensing elements respectively located on the two sides of said central axis of said housing, said control module records a move distance of said autonomous vehicle in the time interval between said border sensing elements respectively sending a signal representing that it reach a predetermined distance from said limit, and calculates the angle between said central axis and said border.

Preferably, said limit detecting module comprises border sensing elements respectively located on the two sides of said central axis of said housing, said control module records a move distance of said autonomous vehicle in the time interval between said border sensing elements respectively sending a signal representing that it is out of said limit, and calculates an angle between said central axis and said border.

Preferably, when the autonomous vehicle reaches the predetermined location relationship, the control module drives the driving module to perform turning based on the signal transmitted from the limit detecting module that represents one side of the autonomous vehicle closer to the limit, so that the distance from one side of the autonomous vehicle to the limit is always smaller than that from the other side to the limit.

Preferably, when the autonomous vehicle reaches the predetermined location relationship, the control module drives the driving module to perform turning based on the signal transmitted from the limit detecting module that represents one side of the autonomous vehicle closer to the limit, the autonomous vehicle makes a turn clockwise if the left side is closer to the limit when reaching the predetermined location relationship; and the autonomous vehicle makes a turn anticlockwise if the right side is closer to the limit.

Preferably, said limit detecting module comprises border sensing elements respectively located on the two sides of said central axis of said housing.

Preferably, said border sensing elements are arranged symmetrically with respect to said central axis, located on the front portion of said housing.

Preferably, the angle of said turn is greater than or equal to 90 degrees, less than 180 degrees.

Preferably, the autonomous vehicle is a robot mover, also comprising a cutting assembly located below the housing and a cutting motor driving the cutting assembly.

The present invention also provides an autonomous working system, comprising a limit for limiting the working scope of the autonomous working system, and also comprising the mentioned autonomous vehicle.

Preferably, the limit comprises a border line signal generating element and a border line in connection with the border line signal generating element. The border line signal generating element sends periodical current signals to the border line, said border sensing elements are inductors.

The autonomous vehicle moves to the limit; the autonomous vehicle detects the location relationship with the limit; when reaching a predetermined location relationship with the limit, the autonomous vehicle makes a turn to move away from the limit, said autonomous vehicle keeps moving from moving towards the limit and reaching the predetermined location relationship to completing the turn.

Preferably, the autonomous working system further comprises the following procedure: when the autonomous vehicle and the limit reach a predetermined location relationship, the autonomous working system detects the angle relationship between the autonomous vehicle and the limit, wherein the limit is divided into two sides.

Preferably, the autonomous working system further comprises the following procedure: the autonomous working system detects the angle relationship between the autonomous vehicle and the limit when the autonomous vehicle and the limit reach a predetermined location relationship, and makes a turn in a direction where the central axis and the limit forms an acute angle or right angle.

Preferably, the angle of said turn is greater than or equal to 90 degrees, less than 180 degrees.

The present invention also provides an autonomous vehicle for moving and working in a working scope limited by the limit, comprising a housing, a driving module, a limit detecting module, an energy module and a control module, wherein the housing has a longitudinal axis and is divided into two sides by the central axis, namely left side and right side; the driving module is mounted on the housing, drives the autonomous vehicle to move and make a turn, and comprises a wheel set and a driving motor for driving the wheel set to move; the limit detecting module detects the location relationship between the autonomous vehicle and the limit; the energy module is mounted on the housing for providing energy for the autonomous vehicle; and the control module is electrically connected with the driving module and the limit detecting module; after move to the limit and reaches a predetermined location relationship, the autonomous vehicle makes a turn to move away from the limit, after the turn begins and before the turn is completed, said control module controls the driving module to make the autonomous vehicle move along the limit for a distance.

Preferably, after the turn begins and before the turn is completed, said control module controls the driving module to make the autonomous vehicle move along the limit for a predetermined distance or a predetermined time.

Preferably, the predetermined distance is between 20 cm and 100 cm.

The control module drives the driving module to perform turning based on the signal representing the angle relationship between the autonomous vehicle and the limit from the limit detecting module, so that the driving module drives the autonomous vehicle to make a turn in a direction where the acute angle or right angle between the central axis or limit is reduced.

Preferably, said control module drives said driving module to perform turning based on a signal representing said angle relationship between said autonomous vehicle and said limit from said limit detecting module, so that said driving module drives the autonomous vehicle to make a turn in a direction where an acute angle or right angle between the central axis or limit is reduced.

Preferably, when the autonomous vehicle reaches the predetermined location relationship, the control module drives the driving module to perform turning based on the signal transmitted from the limit detecting module that represents one side of the autonomous vehicle closer to the limit, so that the distance from one side of the autonomous vehicle to the limit is always smaller than that from the other side to the limit.

When the autonomous vehicle reaches the predetermined location relationship, the control module drives the driving module to perform turning based on the signal transmitted from the limit detecting module that represents one side of the autonomous vehicle closer to the limit, the autonomous vehicle makes a turn clockwise if the left side is closer to the limit and makes a turn anticlockwise if the right side is closer to the limit.

Preferably, said autonomous vehicle keeps moving from moving towards the limit and reaching the predetermined location relationship to completing the turn.

Preferably, the autonomous vehicle is a robot mover, also comprising a cutting assembly located below the housing and a cutting motor driving the cutting assembly.

The present invention also provides an autonomous working system, comprising a limit for limiting the working scope of the autonomous working system, and also comprising the mentioned autonomous vehicle.

Preferably, the limit comprises a border line signal generating element and a border line in connection with the border line signal generating element. The border line signal generating element sends periodical current signals to the border line; said limit detecting module comprises inductors for sensing said border line signal. Preferably, when the autonomous vehicle moves along the line, the control module controls the driving module to keep the distance from the border sensing elements to the border lines unchanged.

Preferably, two border sensing elements are respectively located on two sides of the central axis. When autonomous vehicle moves along the border line, one border sensing element is located within the border line, while the other border sensing element is located out of the border line. The control module controls the driving module to keep the distances from the two border sensing elements to the border line equal.

The present invention also provides a turning method of an autonomous vehicle. The autonomous vehicle has a central axis which divides the autonomous vehicle into two sides, namely left side and right side. The turning method comprises the following steps: the autonomous vehicle moves towards the limit; the autonomous vehicle monitors the location relationship with the limit; when the autonomous vehicle reaching a predetermined location relationship with said limit, the autonomous vehicle makes a turn and moves away from the limit, and after the turn begins and before the turn is completed, said control module controls the driving module to make the autonomous vehicle move along the limit for a distance.

Preferably, the method further comprises following steps: the autonomous vehicle judges which side is closer to the limit when reaching a predetermined location relationship, when the turn is completed, the distance from one side of the autonomous vehicle to the limit is always smaller to that from the other side to the limit, while one side is closer to the limit when the turn begins.

Preferably, the autonomous vehicle makes a turn clockwise if the left side is closer to the limit when reaching the predetermined location relationship; and the autonomous vehicle makes a turn anticlockwise if the right side is closer to the limit.

The present invention also provides an autonomous vehicle for moving and working in a working scope limited by the limit, comprising: a housing having a longitudinal central axis; a driving module mounted on said housing, said driving module drives said autonomous vehicle to move and make a turn, and comprises a wheel set and a driving motor for driving the wheel set to move; a limit detecting module mounted on said housing for detecting a location relationship between said autonomous vehicle and said limit, an energy module mounted on the housing for providing energy for said autonomous vehicle, said control module is electrically connected with the driving module and the limit detecting module. After receiving the collision signal, the control module drives the driving module to bring the autonomous vehicle to make a turn and return back into the border line. After receiving the collision signal again, the control module records a numerical value representing the time interval between the two collision signals or the moving distance, and if the numerical value is greater than a first predetermined value, determines the turn is made in the direction where the obtuse angle between the central axis of the robot mower and the border line is reduced when crossing the border line for the first the time.

Preferably, the number of the border sensing elements is one.

Preferably, the control module compares the numerical value with a second predetermined value, determines the turn is made in the direction where the acute angle between the central axis of the robot mower and the border line is reduced when crossing the border line for the first time if the numerical value is smaller than the second predetermined value, and determines the turn is made in a direction where the right angle between the central axis of the robot mower and the border line is reduced when crossing the border line for the first time if the numerical value is between the first numerical value and the second numerical value.

Preferably, the first predetermined time is equal to the second predetermined time.

Preferably, when it is determined that the turn is made in the direction wherein the obtuse angle between the central axis of the robot mower and the border line is reduced when crossing the border line for the first time, the control module controls the driving module to perform turning reversely until the central axis and the edge of the original obtuse angle that is located on the border line after the reverse turn.

The present invention also provides an autonomous working system comprising: border line with border signal for limit a working scope; border signal generator for sending border signal to said border line, said autonomous working system further comprising mentioned autonomous vehicle.

Preferably, said border signal generator sends periodical current signal.

The present invention also provides a turning method of an autonomous vehicle, said autonomous vehicle has a central axis, said method comprises following steps: move to a border line; cross and go outside the border line first time; make a turn to the inner side of the border line; cross the border line second time; record the data representing the time interval or moving distance between two collision signal representing the two crosses; if the data is greater than a first preset value, then judge that said turn was toward a direction that reducing an obtuse angle between a central axis of said autonomous vehicle when it across the border line first time.

Preferably, said method further comprising following steps: compares the data with a second preset value, judges that the turn was towards the direction that reduce the acute angle between the central axis and the border line when the autonomous vehicle across the border line first time if said data is less than said second preset value; judges that the turn was towards the direction that reduce the right angle between the central axis and the border line when the autonomous vehicle across the border line first time if said data is less than said second preset value.

Preferably, said method further comprising following steps: when judging that said turn was toward a direction that reducing an obtuse angle between a central axis of said autonomous vehicle when it across the border line first time, said autonomous vehicle make a turn reversely until that the central axis form an acute angle with the border line which forms an obtuse angle with the central axis before.

Compared with the prior art, the present invention has the beneficial effects: the included angle between the autonomous vehicle keeping turning and the border line on the other side of the intersection point is also an acute angle, or the turning to the working scope is completed at a small angle on the premise that the distance from one side of the autonomous vehicle approaching the border first to the limit is smaller than that from the other side to the limit, so it is finally achieved that the autonomous vehicle moves in a direction.

If the working scope is divided into two parts by the limit vertical line at the intersection point of the autonomous vehicle and the limit, the autonomous vehicle moves from one part to the other part after turning instead of staying in the original part. In this way, the autonomous vehicle more usually moves to different areas and therefore increases the working scope coverage efficiency, and more easily moves out of the complicated area.

Moreover, the autonomous vehicle keeps moving when turning or from approaching the limit to leaving from the limit, or the driving motor keeps driving the wheel set, thereby greatly improving the overall efficiency of the robot mower, increasing the efficiency, saving energy, protecting the environment, improving the service life of the battery, and cutting more grasses or doing more work in the unit battery time.

Statistically, the autonomous vehicle can do an extra work of 20% on condition that the battery is full after the path planning mode is employed, effectively using the inertia of the device itself and achieving an excellent energy-saving effect. Meanwhile, in the working time, the work done by the autonomous vehicle employing the method is 35% more than that of the autonomous vehicle not employing the method, thereby greatly improving the working efficiency.

BRIEF DESCRIPTION OF SEVERAL VIEWS OF THE ATTACHED DRAWINGS

FIG. 10 is a path diagram of an autonomous vehicle in the prior art passing through a narrow area.

FIG. 11 is a path diagram of the autonomous vehicle in the specific embodiment of the present invention that passes through the narrow area.

FIG. 12 is another path diagram of the autonomous vehicle in the specific embodiment of the present invention that passes through the narrow area.

DETAILED DESCRIPTION OF THE PRESENT INVENTION

The specific implementation of the present invention is described in further detail with reference to the attached drawings.

Figure 1:
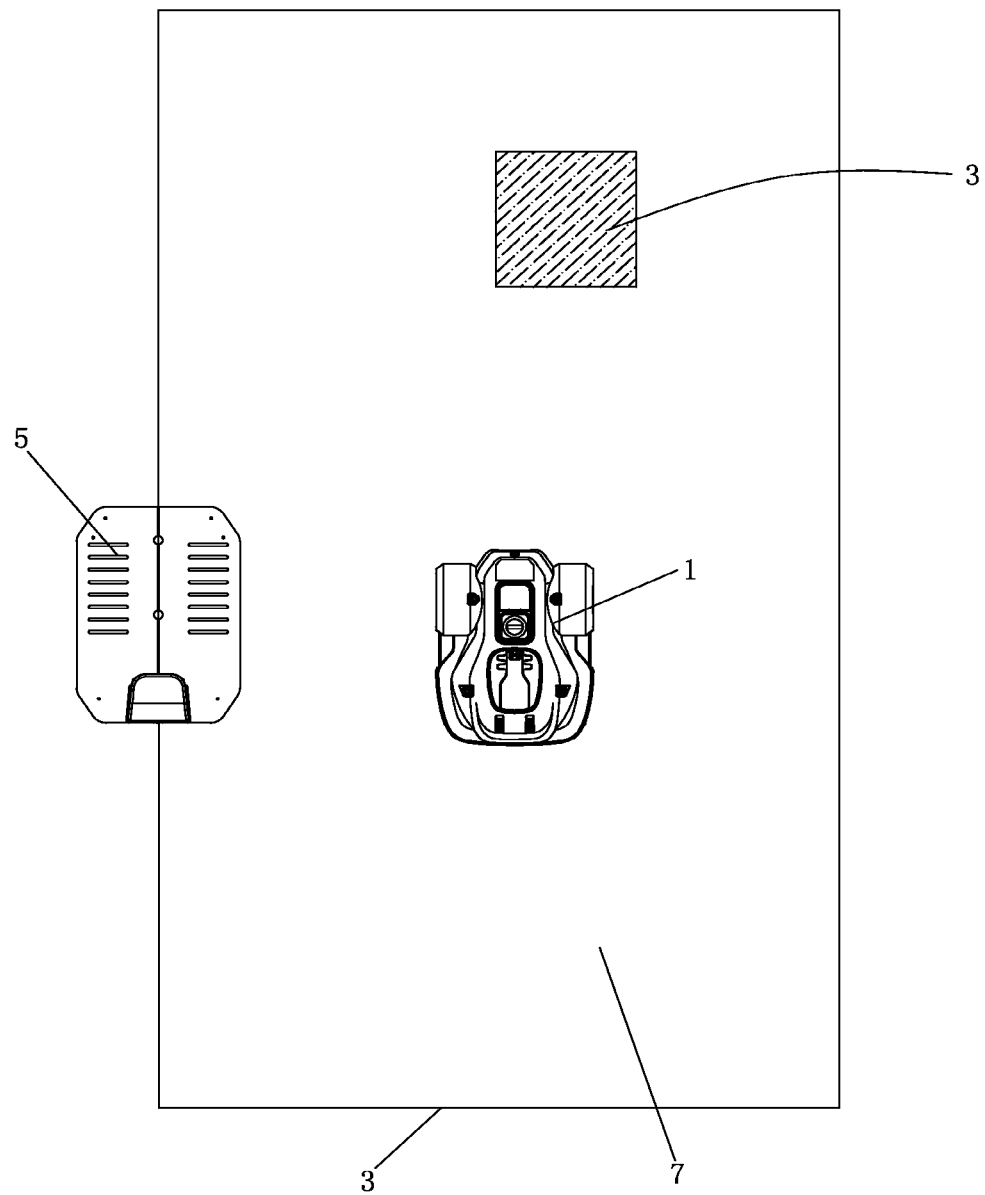
FIG. 1 is the general view of the autonomous working system in the specific embodiment of the present invention.

As shown in FIG. 1, the autonomous working system in the embodiment of the present invention comprises an autonomous vehicle 1, a limit 3 and a dock 5, wherein the limit 3 is used for limiting the working area 7 of the autonomous working system; the autonomous vehicle moves and works within or between the limit; and the dock is configured for supplying docking for the autonomous vehicle, in particular for supplying energy after the autonomous vehicle returns to supplement energy.

Limit is the common name of borders and obstacles. The border is the periphery of the whole working area, usually connected end to end to enclose the working area. The border may be a tangible body like a wall, fence, rail, etc., or electronically virtual signal border like an electromagnetic signal or optical signal sent by the a border signal generator. The obstacle covers a part or an area where the autonomous vehicle cannot move in the working scope, such as sofas and beside tables in the room and pools and flower-stand out of the room. Similarly, the obstacle may also be tangible or electronically virtual. The tangible obstacles may be formed by the mentioned obstacles, while the electronic obstacles are formed by virtual obstacle signals transmitted by the border signal generator. The virtual border signal and the virtual obstacle signal may be the same signal or different signals, upon the specific demands.

The autonomous vehicle may be a robot mower or an autonomous dust collector, autonomously moving on the ground or surface within the working area to mow grasses or collect dust. Of course, the autonomous vehicle is not limited to the robot mower and the autonomous dust collector, and may be other devices such as spraying devices and monitoring devices suitable for unmanned supervision.

The autonomous vehicle 7 comprises a driving module, a working module, a limit detecting module, an energy module, a control module, etc.

The driving module is used for driving the autonomous vehicle to move in the working area 7, usually composed of a wheel set installed on the autonomous vehicle 7 and a driving motor for driving the wheel set to move. The wheel set comprises driving wheels connected with the driving motor and auxiliary wheels for auxiliary support. Preferably, in the embodiment of the present invention, two driving wheels are located at the rear portion of the autonomous vehicle 7, each connected with a driving motor; one or two auxiliary wheels are located at the front part of the autonomous vehicle.

The working module is used for executing the specific working tasks of the autonomous vehicle. If the autonomous vehicle 7 is an autonomous dust collector, the working module comprises a motor, a dust collection opening, a dust collection pipe, a vacuum chamber, a dust collecting unit, and other working parts for executing the dust collection task; if the autonomous vehicle 7 is a robot mower, the working module comprises cutting blades, a cutting motor, and may also comprise parts for optimizing or regulating the mowing effects such as a mowing height regulator.

The limit detecting module is used for detecting the relative location relationship between the autonomous vehicle 7 and the limit 3, wherein the relative location relationship specifically may comprise one or several of the distance, angle, and location in or out of the limit. The limit detecting modules may vary with compositions and principles, such as the far infrared ray type, ultrasonic wave type, collision detection type, magnetic sensing type limit detecting modules; the location and quantity of the sensors and the corresponding signal generators are also diversified, related to the path planning mode. Therefore, the embodiment and path planning modes will be described in detail below.

The energy module is used for supplying energy for the autonomous vehicle 1 to complete various work, comprising a chargeable battery and a charging connection structure. The charging connection structure usually is a charging electrode exposed from the autonomous vehicle.

The control module is used for controlling the autonomous vehicle 1 to autonomously move and work. It is the core part of the autonomous vehicle 1, and functions thereof include controlling the working module to start working or stop, generating a moving path and controlling the driving module to move along the moving path, judging the remaining energy of the energy module and give instructions to the autonomous vehicle to return to the dock for charging, etc. The control module usually comprises a singlechip machine, a memory and other peripheral circuits.

Except for the mentioned modules, the autonomous vehicle 1 also comprises a housing for accommodating and installing various modules, a control panel operated by a user, etc., and also comprises various environmental sensors, such as the humidity sensor, temperature sensor, acceleration sensor, light sensor, etc. Those sensors can help the autonomous vehicle to judge the working environment to execute the corresponding program.

The dock 5 is usually located within the working scope, beside the limit 3 or on the limit 3, and connected with the commercial power or other power supply system for charging the autonomous vehicle. The dock 5 is provided with a charging electrode for docking with the corresponding electrode of the autonomous vehicle 1.

The following is the detail description of the path planning mode in the embodiment, in particular the way of leaving the limit and returning back into the limit, and the path planning mode for narrow areas where the common autonomous vehicles 1 have difficult in movement.

Before describing the path planning mode, the structure of a specific autonomous working system is introduced first, and lays a basis for describing various path planning modes. It should be noted that the specific structure of the autonomous working system only are introduced for uniform and convenient description, is not exclusive and can be appropriately changed, and some of the changes are described in detail in the following text.

Figure 2:
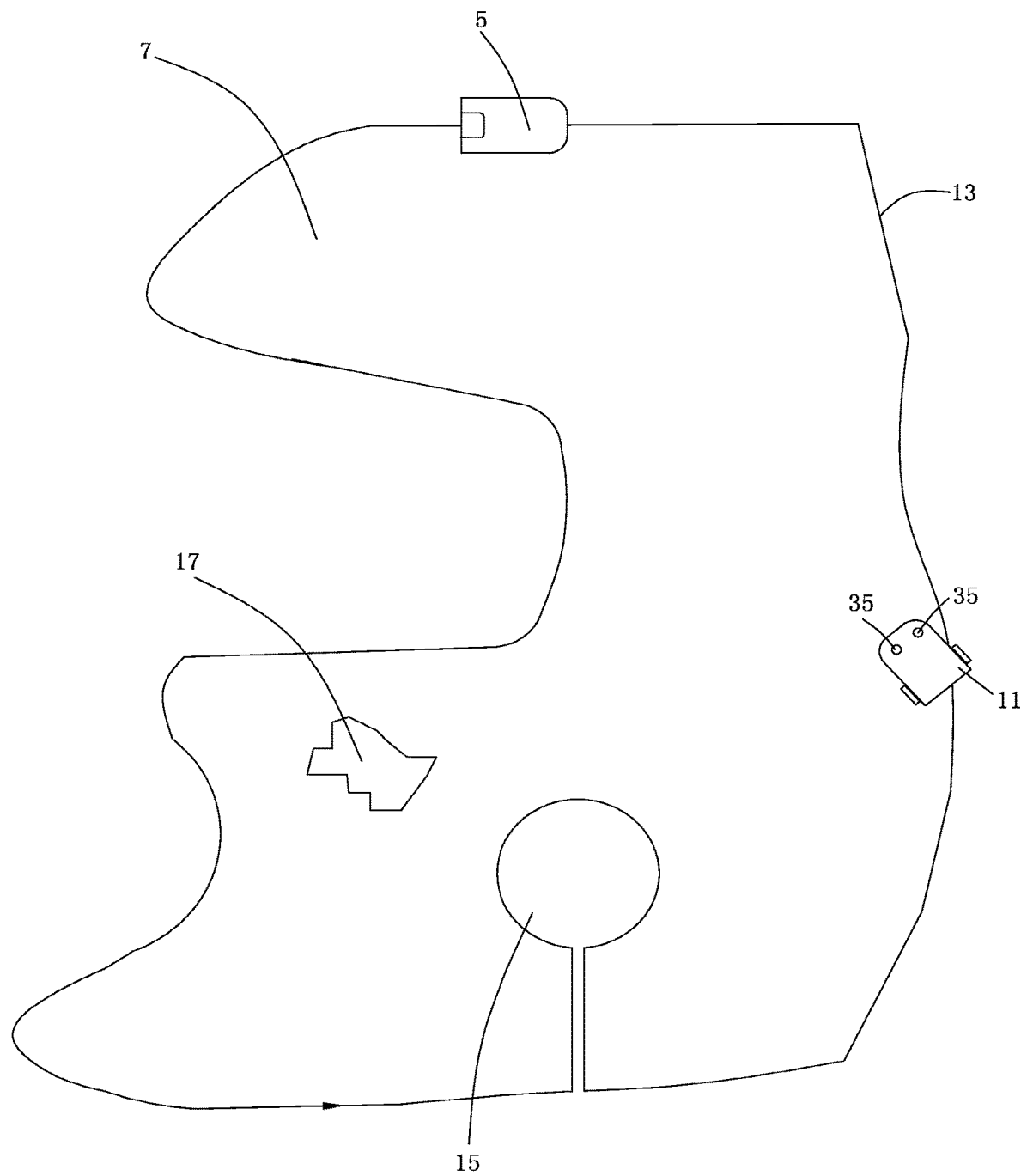
FIG. 2 is the general view of the robot mover system in the specific embodiment of the present invention.

As shown in FIG. 2, this autonomous working system is an autonomous mowing system. The autonomous mowing system comprises: a robot mower 11 as the autonomous working system, a dock 5 for docking and charging the robot mower, a border signal generator for generating the border signal, and a border line 13 connected with the border signal generator. The border line 13 and the border signal generator form a closed ring. The border line 13 has the border signal, and the working scope of the robot mower is formed within the border line 13.

The border signal generator periodically generates and sends electric signals into the border line 13. The border line 13 is a lead on which the corresponding periodical current passes. The periodic current generates a magnetic field periodically. The magnetic field has direction and intensity, in opposite direction on two sides of the border line, namely in opposite direction toward and backward the working scope, and the magnetic field signals become intense when approaching the border line.

Preferably, the periodical current signal is a square wave pulse signal easily generated and identified, and can reduce cost and improve efficiency.

Also as shown in FIG. 2, an island 15 locates in the working scope. The island 15 is an area within the working scope, and the autonomous vehicle 1 shall not work there, but bypass it. The island 15 may be a flower-stand, a pool, etc. where the autonomous vehicle 1 cannot pass. In this autonomous mowing system, the island 15 is also surrounded by the border line 13. As shown in the figure, the border line 13 extends to the island 15 from an appropriate position of the border, surrounds the island 15 in a circle, goes back to the starting point of the border line, and then returns to the border along the border line 13. In this way, the border signal exists on the periphery of the island 15, and the robot mower 15 will not enter the island 15, while the island 15 and the border has two border lines 13 close to each other but opposite in direction. The currents on those two border lines 13 are opposite in direction, so the generated magnetic fields are counteracted. Due to no border signal, the robot mower 11 can pass freely.

In this autonomous mowing system, the border line 13 is preferably configured at a position at a distance from the actually physical limit of the area to be mowed, such as a position in a lawn at a distance of 30 cm away from the edge of the lawn, or a position at a distance of 30 cm away from the flower-stand in the island 15. This is because the limit is a virtual signal and cannot physically block the robot mower 11. Therefore, a distance of inertia movement is reserved for the robot mower 11, and the robot mower 11 still can move out at a certain distance after monitoring the border line and does not leave the real working scope.

Also as shown in FIG. 2, an obstacle 17 exists in the working scope, and specifically may be an earth slope, a stone, a tree, etc. In this robot mower system, the similar obstacles do not form the island 15 by means of the border line, but are detected by the obstacle sensor installed on the robot mower 11.

Figure 3:
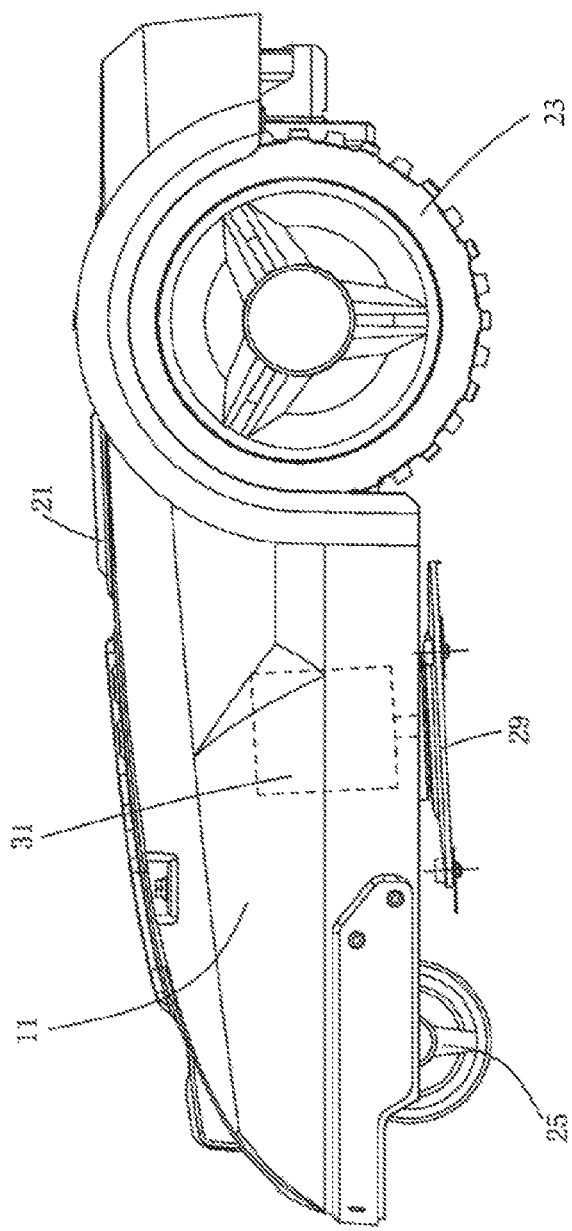
FIG. 3 is the structural view of the specific embodiment of the present invention.

FIG. 3 is a structural view of the robot mower of the robot mower system. As mentioned above, the autonomous vehicle comprises a housing 21, and a driving module, a working module, a limit detecting module, an energy module, a control module, etc. installed on the housing.

In this robot mower 11, the driving module comprises a wheel set installed below the housing. The wheel set comprises driving wheels. Two driving wheels are respectively located on the two sides in the rear of the housing 21. The wheel set also comprises auxiliary wheels 25. Two auxiliary wheels are respectively located on the two sides on the front of the housing 21. The driving module also comprises a driving motor connected with the driving wheels. The driving motor is responsible for driving the driving wheels 23 to rotate to bring the robot mower 11 to move and also responsible for driving the driving wheels 23 to perform turning. In this robot mower 11, two driving wheels 23 are respectively connected with a driving motor. The rotation speed of the driving motor is controlled by the control module. When the control module orders the two driving motor to rotate in the same direction at the same speed, the robot mower 11 moves along a straight line; when the control module orders the two driving motor to rotate at different speeds or in different directions, the robot mower 11 performs turning towards the side on which the driving wheels rotates at a slower speed or the side on which the driving wheel goes back.

In the robot mower 11, the working module comprises a cutting module 29 installed below the robot mower and a cutting motor 31 for driving the cutting module 29 to mow grasses. The cutting module 29 can be a blade connected to the mowing output shaft or a combination of a cutter and a blade connected to the mowing output shaft, and the specific structure thereof may be known for those skilled in the art and therefore is not described in detail.

In the robot mower 11, the limit detecting module are border sensing elements 35 installed in the housing 21. Specifically, the robot mower has a longitudinal central axis 33. The central axis 33 drives the housing 21 into two sides, namely left side and right side. The border sensing elements 35 are electric inductors (inductors for short) respectively installed on two sides of the central axis 33. Preferably, two electric inductors are symmetrically installed on two sides of the central axis 33, at the front part of the housing 21. The advantage that the electric inductors are located at the front is that the border signal can be sensed more quickly and accurately. The limit detecting module is connected with the control module to transmit the monitored border signal to the control module. Of course, more the electric inductors also can be located in the middle part or rear part of the housing 21 to increase the accuracy of the border signal identification.

In the robot mower 11, the energy module is a chargeable battery located in the housing 21, and a charging electrode connected with the chargeable battery. The charging electrode is located at the front part of the housing and exposed out of the housing 21 for docking with the corresponding charging electrode of the dock 5 when the robot mower 11 enters the dock 5 and charging the robot mower 11.

In the robot mower 11, the control module 11 is located in the housing 21, comprising a microcontroller, a memory, etc. The memory is used for storing the working programs of the robot mower and the related parameters of the robot mower in the working process, information fed back by other modules, etc. The microcontroller is used for receiving signal sent from other systems and the programs built in the memory, performing calculation and sending corresponding working orders to the modules.

The robot mower 11 also comprises an obstacle monitoring module which is specifically a collision sensor installed on the housing. When the robot mower 11 collides with an obstacle, the collision sensors detect collision, generate collision signals and transmit the collision signals to the control module.

The robot mower 11 also comprises a control panel for setting the working mode by the operator. More details are not described here.

The working mode of the autonomous mowing system is briefly introduced below. The robot mower 11 cruises and mows grasses in the working scope surrounded by the border line 13. In normal cases, the autonomous mower 11 moves in a straight way until colliding with the limit, namely the border line 13 or the obstacle 17. If collides with the border line 13 or the obstacle, the robot mower 11 performs turning, returns back into the limit, and keeps moving straightly until colliding with the limit again. The robot mower 11 works in the whole working area 7 by the mentioned way of continuously moving back in the limit. When the robot mower 11 reaches a predetermine lower level of power or is required to be return back to the dock 5 because other situations occur, the control module controls the robot mower 11 to seek the border line 13 and move along the border line 13. The dock 5 is located on the border line 13, so the robot mower 11 moves back into the dock 5 along the border 13 and then is docked and charged or berthed in the dock 5.

When the autonomous working system represented by the above mentioned autonomous mowing system works, turning back into the limit after reaching the limit is the most frequent situation of work suspension, and improving the efficiency of turn will directly and greatly improve the working efficiency of the autonomous working system.

Therefore, the way of leaving the limit and returning back into the limit in the embodiment of the present invention is described first. The autonomous vehicle 1 inevitably collides with the limit after moving for a period of time. When the autonomous vehicle 1 monitors that it reaches the limit through the limit detecting module, the mutual relative location relationship is the mentioned angle relationship, interior-exterior relationship, angle relationship, etc. The limit detecting module sends the signals such as the approach degree signal and/or angle relationship signal that represents those location relationships to the control module. The autonomous vehicle performs turning to move away from the limit after moving towards the limit and reaching a predetermined location relationship to ensure not leaving the working scope. The signal received by the control module from the limit detecting module may represent the angle relationship between the autonomous vehicle and the limit, the side of the autonomous vehicle close to the limit, or several of the mentioned items. This depends on how to interpret the signal sent from the limit detecting module.

The mentioned predetermined location relationship relates to the startup conditions of turning and other vary with the specific autonomous working system. For example, in this robot mower system, the predetermined location relationship is that the robot mower 11 has been already collided with the border line, while one electric inductor is located directly above the border line 13, namely the distance from a certain border sensing element to the limit reaches 0 predetermined distance. While in the autonomous dust collector system, the border is usually a wall, so the predetermined location relationship is usually a distance from the front end of the autonomous dust collector to the border, such as 30 cm. Of course, those examples are schematic, and the predetermined location relationship is set according to the specific demands.

For the specific turning process, the central axis of the autonomous vehicle inevitably forms an intersection point with the limit, and in the situation of not vertically approaching the limit, one side of the autonomous vehicle inevitably is closer to the limit. Then, when the central axis of the autonomous vehicle 1 forms an acute angle with the left or right border line of the intersection point when it is not vertical to the limit, and the autonomous vehicle turning in the direction where the acute angle is reduced can efficiently turn to the limit at a relatively small angle. More abstractly speaking, the autonomous vehicle monitors the location relationship between it and the limit, and the control module makes the driving module to perform turning according to the signal representing the angle relationship between the autonomous vehicle and the limit transmitted from the limit detecting module, so the turning is quicker and more efficient. The control module makes the driving module to make a turn in the direction where the acute angle or right angle between the central axis and the limit is reduced, and always keeps that the central axis of the autonomous vehicle always form an acute angle or a right angle with one side of the limit, while the other side of the limit forms an acute angle or right angle with the central axis of the autonomous vehicle when the turn begins. Similarly, the mentioned process can also be understood that the autonomous vehicle monitors the location relationship between it and the limit, judges which side of it is closer to the limit when reaching a predetermined location relationship with the limit, and performs turning clockwise if the left side is closer to the limit, otherwise performs turning anticlockwise if the right side is closer to the limit; moreover, the turning result is always that the distance from one side of the autonomous vehicle to the limit is smaller than that from the other side to the limit, while said one side is closer to the limit when the turn begins. The two descriptions are different in mode, but consistent in nature. It should be understood that the signal parameters sent by the limit detecting module physically correspond to different scenes.

Figure 6:
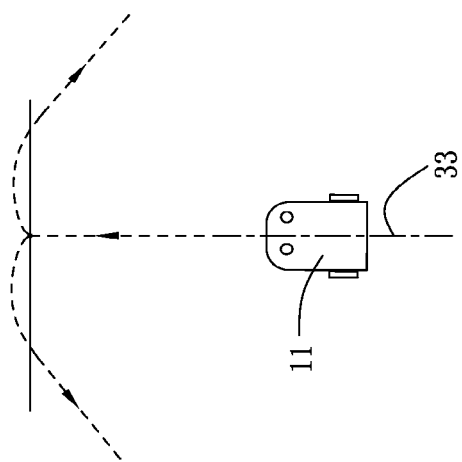
FIG. 6 is a path selecting diagram of the robot mower in the specific embodiment of the present invention.
Figure 5:
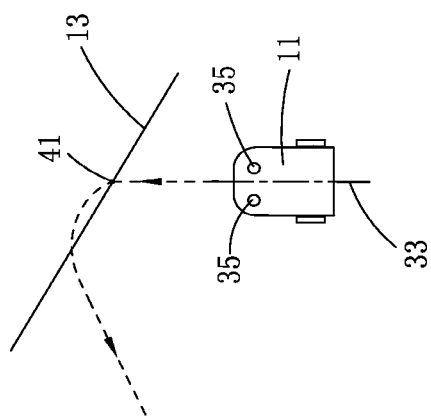
FIG. 5 is a path selecting diagram of the robot mower in the specific embodiment of the present invention.
Figure 4:
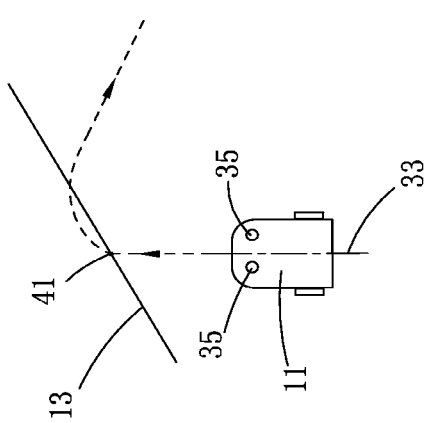
FIG. 4 is a path selecting diagram of the robot mower in the specific embodiment of the present invention.

FIG. 4, FIG. 5 and FIG. 6 are path selecting diagrams of the robot mower 11 after reaching the limit. In FIGS. 4, 5 and 6, the moving direction of the robot mower 11 is identical, and the extension direction of the central axis 33 is identical when the robot mower collides with the border line 13, but the extension direction of the border line 13 in different in the figures, so the turning direction and result are different. In the figures, the dotted line passing through the robot mower 11 is the moving track of the robot mower 11.

In the robot mower system, at the moment when the robot mower 11 collides with the border line 13, the central axis 33 of the robot mower 11 forms an intersection point 41 with the border line 13, then central axis 33 forms an angle with each of the two border lines 13 of the intersection point 41, and the sum of the two angles is 180 degrees. It should be noted that the border lines 13 or the limit may be bent in an overall view, but the border line 13 near an intersection point or the limit may be regarded as a straight line; or it can be said that, the border line 13 or the limit may be bent, but at the predetermined distance for judging the turn, namely the intersection between the central axis 33 and the border line 13 or the limit, the border line 13 or the limit is a straight line in the extension direction, and the extension direction is the tangent line of the border line 13 and the limit. In the next text, the visual and convenient description, it stilled called the included angle between the central axis 33 and the border line 13 or the limit, but the meanings of the central axis 33 and the border line 13 are like that mentioned above, referring to the straight segment of the border line 13 near the intersection point/limit or the extension direction or the tangent direction.

As mentioned above, the robot mover 11 is preferably symmetrically provided with two a border sensing element 35 on two sides of the central axis 33. As shown in FIG. 4, when the robot mower 1 collides with the border line 13 and is not vertical to the border line 13, the left side will collides with the border line 13 first, namely the left border sensing element 35 will sense collision with the border line 13 first and sends a collision signal to the control module that represents that the left side of the robot mower 11 collides with the border line 13. The control module receives the left collision signal first and correspondingly judges that the robot mower moves to the border line 13 from the left side of the intersection point of the border line 13 and the robot mower 11, and the central axis 33 of the robot mower 11 forms an acute angle with the border line 13 on the left side of the collision intersection point. Or, the border sensing element on one side first sends a signal representing that it reaches a predetermined distance from the limit to the control module, and then the control module judges that the limit on one side of the central axis forms an acute angle with the central axis. In other case, if the signal generated by the border sensing element represents that the interior-exterior relationship between the it and the limit, then the border sensing element on one side first sends the signal representing that it goes out of the limit to the control module, and then the control module judges that the limit on one side of the central axis forms an acute angle with the central axis. After the moving direction of the robot mower 11, or the orientation relationship between the central axis 33 of the robot mower 11 and the border line 13 during the collision is determined, the robot mower 11 correspondingly determines the turning direction and turns right, namely the robot mower 11 turns in the direction to reduce the acute angle between the central axis 33 thereof and the border line 13. Or, as shown in FIG. 3, when the turn begins, the left side of the robot mower is closer to the limit, and then the robot mower turns clockwise; and if the right side is closer to the limit, then the robot mower turns anticlockwise. Specifically, the control module of the robot mower 11 controls the driving module, and then the rotation speed of the left driving wheel 23 is bigger than that of the right driving wheel 23, so the robot mower 11 turns right and returns into the working scope 7. In this robot mower 11, the turning angle is fixed, greater than or equal to 90 degrees and less than 180 degrees, preferably a little greater than 90 degrees, between 90 degrees and 120 degrees. The reason that the turning angle is greater than or equal to 90 degrees is to ensure that robot mower 11 moves into the limit when the above mentioned acute angle value is undetermined. If this angle vale is determined, the corresponding appropriate turning angle within 180 degrees can be selected according to the acute angle value, which is described in detail in the text below.

It should be noted that, the time of determining that the robot mower 11 actually collides with the border line 13, so robot mower may cross the border line 13 and then returns into the limit when performing turning. When crossing the border line 13, the other border sensing element 35 of the robot mower 11 may sense collision with the border line 13 and then sends the collision signal to the control module. As mentioned above, the border line 13 of the robot mower system is configured to be a little closer to the inside of the lawn than the physical working scope, so the robot mower 11 does not exceed the actual physical working scope when turning.

As shown in FIG. 5, the extension direction of the border line 11 is different from that in FIG. 4, so the turning direction is different even through the robot mower 1 faces the same direction. Specifically, the right side of the robot 11 collides with the border line 13 first, namely the right border sensing element 35 senses collision with the border line 11 first, and sends a collision signal to the control module to represent that the right side of the robot mower 11 collides with the border line. The control module receives the right collision signal first, and correspondingly determines that the robot mower moves towards the border line from the right side of the intersection point of the border line and the robot mower, and the central axis of the robot mower 11 forms an acute angle with the right border line of the collision intersection point. After determining the moving direction of the robot mower 11 or the orientation relationship between the central axis 33 of the robot mower and the border line 13 during collision, the robot mower 11 correspondingly determines the turning direction and anticlockwise turns left, namely the robot mower 11 turns in the direction to reduce the acute angle between the central axis 33 and the border line 13. Specifically, the control module of the robot mower 11 controls the driving module, so the rotation speed of the right driving wheel 23 is greater than that of the left driving wheel 23, and the robot mower 11 turns left to return into the working scope.

As shown in FIG. 6, the extension direction of the border line 13 is vertical to the moving direction of the robot mower 11 or the central axis 33 of the border line 13 during collision. At this moment, the two border sensing elements 35 of the robot mower 11 sends the collision signal to the control module, and the control module determines that the robot mower 11 vertically moves towards the border line and then controls the moving system to turn randomly.

The turning mode that the robot mower 11 and the border line 13 form different angles are described above, and the angle variation of the robot mower 11 of the present invention in the typical turning process is described in the following text with reference to the FIG. 7.

Figure 7:
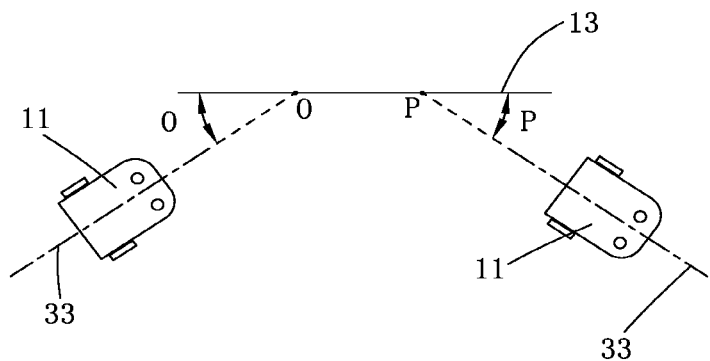
FIG. 7 is a schematic view of the angle relationship between the robot mower and the border line before and after turning in the specific embodiment of the present invention.

As shown in FIG. 7, the moving track of the robot mower 11 crosses the border line 13. The intersection point of the central axis 33 and the border line 13 is O when robot mower 11 crosses the border line 13, and is P when the turn is completed and the robot mower goes back into the limit. When the robot mower crosses the limit, the intersection point of the central axis 33 of the robot mower 11 or the moving track and one side of the border line 13 form an acute angle O, as shown in the figure. Then, the control module controls the robot mower 11 to turn in the direction where the acute angle is reduced, and keep moving during turning, leave the limit, return into the limit, and completes the turn after going back into the limit. After the turn is completed, the intersection point of the central axis 33 of the robot mower 11 and the border line 13 also forms an acute angle P, as shown in the figure. The extension direction of one side of the angle P starting from P that is located on the border line is opposite to that of the angle O starting from O that is located on the border line.

In the robot mower system, the predetermined location relationship for triggering turning is that the predetermined distance is zero, so the track line is intersected with the border line. The peak of the included angle between the central axis 33 of the robot mower 11 and the border line 13 separates before and after the turning. But it is easily understood that the track line translates vertically according to the different predetermined distance, while the intersection point of the track line and the border line 13 changes, even is superposed or disappears, but the two included angles between the central axis 33 and the two border lines 13 are not changed. Simply speaking, each border line 13 is divided into two sides extending in two directions from the intersection point of the central axis 33 and each border line 13 when the turning is triggered, and then the central axis 33 forms an acute angle with one of the sides before turning and forms an acute angle with the opposite other side extending in the other direction after turning.

If the robot mower 11 vertically collides with the border line 13, then forms an acute angle with one of the sides after turning, and forms an acute angle with the opposite side extending in the other direction after turning.

To better understand the present invention, the location variation of the robot mower 11 of the present invention in the typical turning process is described with reference to FIG. 8.

Figure 8:
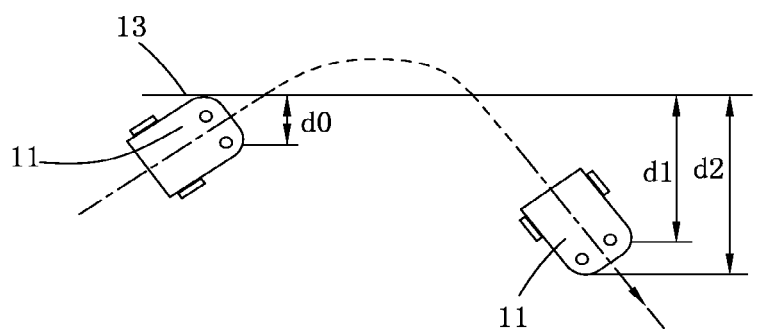
FIG. 8 is a schematic view of the location relationship between the two sides of the robot mower and the border line before and after turning in the specific embodiment of the present invention.

As shown in FIG. 8, one side of the robot mower 11 collides with the border line first, and the other side of the robot mower 11 keeps a certain distance from the border line 13 during collision. As shown in the figure, the distance is $d_0$. The robot mower 11 starts turning at this moment. As mentioned above, if the left side collides with the border line first, the robot mower 11 turns right; if the right side collides with the border line first, the robot mower 11 turns left, meaning if one of the sides collides with the border line first, the robot mower turns in the other side. Also as shown in the figure, the distance from the side of the robot mower that collides with the border line first to the border line 13 or the extension line of the border line 13 is $d_1$, while the distance from the other side to the border line 13 or the extension line of the border line 13 is $d_2$ when the turn is completed and the robot mower 11 enters the limit. As shown in the figure, $d_1$ is smaller than $d_2$ after meaning that the robot mower 11 keeps that the side colliding with the border line first closer to the border line than the other side after the turn is completed.

Specifically, the limit detecting module sends a signal to the control module when detecting that one side of the housing 21 and the limit reach the predetermined distance first, and the control module controls the driving module to bring the autonomous vehicle 1 to turn from one side to the other side. When the turn is completed, the distance from said one side of the autonomous vehicle 1 to the limit is smaller than that from said the other side to the limit.

From the above description it can be seen that, the included angle between the robot mower 11 keeping turning and the other side of the intersection point is also an acute angle, or the robot mower turns into the working scope at a small angle which is at most 180 degrees on the premise that the distance from one side of the robot mower that first approaches the border line to the limit is smaller than that from the other side to the limit. If the robot mower turns in the other direction, the turning angle is at least 180 degrees to reach the identical final angle.

The above mentioned turning mode makes the robot mower 1 moves in a direction finally. If the working scope is divided into two parts by the line vertical to the limit at the intersection point of the autonomous vehicle 1 and the limit, then the autonomous vehicles moves from the original part to another part after the turning instead of staying in the original part. In this way, the autonomous vehicle frequently cruises in different areas to increase the coverage efficiency of the working scope, and more easily goes out of the complicated area.

In the above mentioned turning process, the determining of the limit detecting module on the angle is qualitative, only determining which side of the robot mower collides with the border line first; then correspondingly, the other side turns, and the turning angle does not exceed 180 degrees; or the limit detecting module only judges which border side of the intersection point 41 forms an acute angle with the autonomous mower 11, and then the robot mower 11 correspondingly turns in the direction where the acute angle is reduced, finally forms an acute angle with the other side, and keeps moving straightly.

However, to achieve a better effect, the determining of the limit detecting module on the angle is quantitative, namely monitoring the value of the included angle between the central axis of the robot mower and the border line when the collision is determined. On this robot mower, the realization mode is as mentioned below:

The robot mower 11 is provided with a displacement monitoring element for monitoring the moving distance of the robot mower in a period of time. The displacement and the speed are related parameters, so the robot mower 11 monitors the displacement of the robot mower through monitoring the moving speed. The displacement monitoring speed specifically may be a speed sensor for monitoring the rotation speed of the driving wheels, or an acceleration speed for directly monitoring the speed of the robot mower 11, or other elements capable of monitoring the speed of the robot mower 11.

Before the turn is implemented actually, the two border sensing elements 35 of the robot mower 11 collide with the border lines in succession and respectively send the collision signals to the control module. The displacement monitoring element monitors the displacement in the period that the border sensing elements collide with the border lines in succession. Meanwhile, the distance between the two border sensing elements 35 is a known fixed value, so the included angles between the robot mower 11 and the border lines 13 can be calculated according to the distance between the two border sensing elements and the displacement of the robot mower 11 when the two border sensing elements 35 passes the border lines in succession. That is to say, the control module records the moving distance of the autonomous moving distance in the period of time when the two border sensing elements respectively send the signals representing that they reach a predetermined distance with the limit, or the two border sensing elements respectively send signals representing that they cross the limit, and calculates the value of the included angle between the central axis and the limit. Then, the control module can correspondingly calculate an appropriate turning angle according to the included angle, make the robot mower 11 to keep a fixed angle when leaving the border line or at variable angles. In the case that the angle value can be calculated, the turning angle may be smaller than 90 degrees.

The signal of the island 15 is identical with that of the border line 13, both of them are periodical current signals, so the robot mower 11 determines the direction when colliding with the island 15 in a way identical to that when colliding with the border line 13 and leaves the island 15 when turning.

No border line signal exists on the periphery of the obstacle 17, so the robot mower 11 cannot turn directly after finding the obstacle, but shall stop first, move back and then perform turning. However, the working efficiency is reduced in this mode. Therefore, the robot mower 11 can be also provided with a set of obstacle sensing modules for finding the obstacle 17 before collision and perform turning. Preferably, the obstacle sensing modules can also monitor the angle of the robot mower 11 when colliding with the obstacle 17 so as to perform turning in the mode similar to the mentioned case of collision with border line 13, thus improving the efficiency. For example, the obstacle sensing modules can be an ultrasonic wave transmitting element installed on the robot mower 11 or two ultrasonic wave reducing elements respectively located on the two sides of the robot mower, judging the distance from the obstacle and the angle through the difference between the time that the two ultrasonic wave receiving elements on the two sides receive the reflected ultrasonic wave signals.

It should be noted that the mentioned specific turning structure and mode are only exemplary, and shall not limit the present invention.

As mentioned above, the determining of the limit detecting module on the angle may be qualitative or quantitive. Being qualitative refers to that the limit detecting module only judges which side of the intersection point forms an acute angle with the autonomous vehicle 1, and then the autonomous vehicle 1 turns in the direction where the acute angle is reduced and keeps forming an acute angle with the other side after turning. Being quantitative refers to that the limit detecting module can determine the accurate angle between the autonomous vehicle and the limit, and then the autonomous vehicle turns in a direction where the acute angle is reduced, and selects the turning angle according to the specific turning angle to fulfill the aim of optimizing the turning angle. Optimizing the turning angle may refer to reducing the turning, ensuring that the springing angle in a certain scope, or optimizing the path to increase the coverage rate or reduce the return times.

Also as mentioned above, the limit 3 may be various, a wall in a house or other photo-optical signals, and shall not be limited to the current type border line signal or obstacle. Correspondingly, the limit detecting modules vary with the property of the limit 3, such as the infrared sensor, ultrasonic wave sensor, etc. Usually, the tangible limit can realize turning, and the autonomous vehicle cannot collide with the limit, so the distance between the predetermined turning site and the actual limit may be relatively long, and the sensor is the remote type to ensure no collision with the limit 3 during turning. For the signal type limit 3, the predetermined turning distance is relatively short, and the autonomous vehicle turns when approaching or already colliding with the border. Due to inertia, the real turning track may be intersected with the limit. Of course, the turning determining point of the signal type limit 3 may be set like that of the tangible limit, keeping a certain distance. Therefore, the autonomous vehicle is not intersected with the limit when turning, meaning that the distance from the autonomous vehicle 11 to the limit is greater than or equal to 0 when turning.

As mentioned above, the ways for determining the distance and angle between the autonomous vehicle 1 and the border line are not limited to those described in the specific embodiments, and may other others such as the GPS navigation system similar to the car navigation and the image acquisition technology. The memory of the control module is internally provided with the map of the working scope and the location and direction of the border line, and the autonomous vehicle is internally provided with the GPS navigation module, and then the angle and distance can be determined according to the map information and the GPS information when the autonomous vehicle collides with the border line, and then the mentioned turning mode is employed. The autonomous vehicle is equipped with a camera, and it is feasible to judge the collision direction and distance by identifying the image of the environment. In the present invention, the more important is to determine the turning strategy and direction after turning.

For example, the robot mower 11 realizes the angle judgment and turning direction determination through the border sensing elements on the two sides of the housing 21. However, it is also feasible through just one border sensing element 35.

The principle of determining the turning direction through one sensor is described with reference to FIG. 9. The robot mower 11 crosses the border line. After colliding with the border line, the turning angle of the robot mower 11 is fixed, so the turning track is basically fixed, as shown by the dotted line. However, the direction of the border line 13 is unknown. The locations of three typical border lines 13 are shown in the figure. Providing that the border lines 13 are vertical to the moving direction of the robot mower 11 or the central axis direction during collision, and then the robot mower 11 forms an intersection point O with the border line 13 when going out of the limit and the intersection point P when going back into the limit, and the moving path of the robot mower 11 is an arc line OP. The length of the arc lien OP may be a reference length for judging the angle relationship between the central axis and the border line 13 when the robot mower 11 collides with the border line. If the robot mower 11 forms an acute angle with the left side of the intersection point of the border line 13, then the two intersection points of the robot mower 11 are as shown by the arc line OA, and the length of OA is smaller than that of OP; if the robot mower 11 forms an obtuse angle with the left side of the intersection point of the border line 13, the two intersection points of the robot mower 11 are as shown by the arc line OB, and the length of OB is greater than that of OP. In this way, the angle relationship between the robot mower 11 and the border line 13 can be obtained by detecting the moving distance when the robot mower 11 goes out and goes into the limit and comparing the moving distance with OP. Then, corresponding action can be adopted, such as turning again when the moving distance is greater than OP.

Specifically, when only one border sensing element 35 is available, the robot mower 11 moves towards the border line 13 until sensing that it is located above the border line 13. At this moment, the border sensing element 35 sends the collision signal to the control module. After the receiving the collision signal, the control module sends an order to the driving module to turn at a predetermined angle and move towards the limit. In such circumstance, the control module cannot judge whether this turning direction is the direction where the non-obtuse angle between the central axis 33 of the robot 11 and the border line 13 is reduced, and the robot mower 11 keeps moving, so the border sensing element 35 crosses the border to go outside. During turning or after turning, the border sensing element 35 returns into the limit from the outside, and passes the border line 13 from the above. The control module records the time cost when the border sensing element crosses the border line 13 twice, compares the time with one or more reference time, judges that the turning faces the acute angle between the central axis 33 and the border line 13 when the robot mower 11 collides with the border line if the time is smaller than a predetermined first reference time, that the turning faces the direction where the right angle between the central axis 33 and the border line 13 is reduced when the robot mower 11 collides with the border line if the time is equal to the reference time or is between two preference time, and that the turning faces the direction where the obtuse angle between the central axis 33 and the border line 13 is reduced when the robot mower 11 collides with the border line if the time is greater than a preference time.

Judging the turning direction obtains the angle relationship between the central axis of the robot mower 11 and the border line 13 during collision, and the angle relationship between the direction of the robot 11 and the border line 13 after turning. Then, the robot mower 11 can adopt the corresponding actions, for example controlling the robot mower 11 to perform turning reversely on condition that the turning faces the direction where the obtuse angle between the central axis 33 and the border line 13 is reduced when the robot mower 11 collides with the border line, so the moving direction of the robot mower 11 or the central axis 33 after turning form an acute angle with the border line 13 which forms an obtuse angle with the central axis when the robot mower 11 collides with the border line.

To determine the relationship between the direction of the first turning and the original moving direction, optionally, the robot mower 11 is provided with a displacement detecting element for detecting the moving distance of the robot mower 11 at the interval that the border sensing element 35 of the robot mower 11 crosses the border line twice, comparing the distance with one or more reference distances and then determines the turning direction. The process and direction are similar to those in comparison with the reference time and therefore are not described in detail. Of course, the robot mower 11 can record the time interval of crossing the border line twice and the moving distance to increase to the accuracy of judgment.

The mentioned turning method also keeps the robot mower moving in the whole turning process, and the direction leaving the border line forming an acute angle with the border line 13 which forms an obtuse angle with the central axis 33 when the robot mower 11 collides with the border line. It is of directivity, obviously prior to the prior art.

It should be noted that the turning mode of the present invention is particularly beneficial when passing through the narrow areas. FIG. 10 and FIG. 11 are respectively path comparison diagrams of the autonomous vehicle passes through the narrow areas on condition that the path planning mode is not used and used, and the dotted line is the moving path. It can be obviously seen that, it is very difficult for the autonomous vehicle 1 to leave the narrow area when the path planning mode is not used, and the autonomous vehicle 1 may luckily leave the narrow after turning around; moreover, the leaving time is unknown. If the path planning mode is employed, the autonomous vehicle 1 has a direction and can leave the narrow area after turning around for limited times. Actual calculation shows that, in a typical narrow area, it costs an average time of 5 min for the autonomous vehicle to leave the narrow area if the path planning mode is not used, and 30 s if the path planning method is used.

It also should be noted that, the common autonomous vehicle 1, no matter the mower or dust collector, shall stop when encountering the limit 3 and then can perform turning. Encountering the limit 3 is very frequent, which greatly affects the working efficiency of the autonomous vehicle 1, resulting in that 15% of time is cost on braking/stopping and startup instead of actual working. Besides, frequent startup and stop also affect the service life of the mechanical elements of the autonomous vehicle 1 and waste energy. The autonomous vehicle 1 of the present invention can greatly reduce the stopping/braking times. During turning or from the autonomous vehicle moves towards the limit and reaches the predetermined location relationship to end of the turning, the autonomous vehicle keeps moving or the driving motor keeps driving the wheel set, thereby greatly improving the overall efficiency of the mower, saving energy, protecting the environment, prolonging the service life of the battery, and cutting more grasses or doing more work in a unit time.

Statistically, the autonomous vehicle 1 can do 20% of extra work on the same condition of full power after the path planning mode is employed, effectively using the inertia thereof and achieving a very good energy-saving effect. Meanwhile, in the same working time, the moving distance of the autonomous vehicle adopting the path planning mode is 35% greater than that of the autonomous vehicle not adopting the path planning mode, so the working efficiency is greatly improved. To improve the working efficiency to the maximum extent, the autonomous vehicle 1 has such a mode in which the mower always keeps moving and never stops during turning when carrying out the work tasks. Of course, the mentioned turning mode may be one of a plurality of the path planning modes of the autonomous vehicle. The autonomous vehicle enables this mode only when detecting that it locates in the narrow area or corner area. The detecting mode may be: quickly colliding with the border for several times, or colliding the border line for predetermined times in a predetermined time period.

To obtain the optimized path, in particular to further optimize the speed of leaving the narrow area, the specific embodiment of the present invention also provides another path planning mode. Such path planning mode makes the autonomous vehicle quickly leave the narrow area by moving along the limit 3 for a distance after encountering the limit 3. After approaching the limit 3, the autonomous vehicle rotates slightly first to adjust the moving direction to be consistent with the extension direction of the limit 3, then moves at a predetermined distance along the extension direction of the limit 3, and turns towards the limit 3 again. After the turn begins and before the turn is completed, the autonomous vehicle moves for a distance. The specific way of moving for a distance may be that the autonomous vehicle moves for a predetermined time or a predetermined distance, and the predetermined distance is 20 cm-100 cm.

Figure 9:
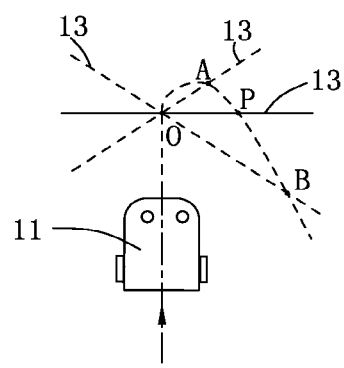
FIG. 9 is a schematic view of the turning of the robot mower by means of a sensor in the specific embodiment of the present invention.

FIG. 9 is a schematic view of the moving path of the robot mower 11 adopting the path planning mode. As shown in FIG. 12, similarly, the robot mower 11 has border sensing elements 35 located on two sides of the housing 21. After moving for a distance, the robot mower 11 collides with the border line 13. In the case of non-vertical collision, one border sensing element 35 collides with the border line first and sends the collision signal to the control module. The control module correspondingly judges the angle relationship between the central axis 33 of the robot mower 11 and the border line 13, then gives an order to the driving module to turn in a direction where the acute angle or right angle between the central axis 33 and the border line 13 is reduced. During or after turning, the border sensing element 35 which previously crossed the border line 13 moves back into the limit, while the other border sensing element 35 still locates out of the limit. The robot mower stops turning and starts to move along the border line 13.

When the robot mower moves along the border line 13, the control module corrects the moving direction at any time to ensure that the mentioned one border sensing element 35 locates in the limit and the mentioned other border sensing element 5 locates out of the limit, namely ensuring the magnetic fields of two electric inductors are opposite. In this way, the robot mower 11 always locates in the limit on one side, and out of the limit on the other side, realizing moving cross and along the border line 13. When a certain side of the robot mower 13 moves out of the limit or into the limit, the magnetic fields sensed by the two electric inductors are identical, and the robot mower correspondingly rotates slightly in a direction to make the side move back into or out of the limit, so the magnetic fields sensed by the two electric inductors are kept opposite. In this way, the control module controls the driving module to keep the distances between the two electric inductors and the border lines equal. However, the mentioned mode of moving across the border line and the quantity of the electric inductors are not necessary. As long as the control module controls the driving module to keep the distances from the electric inductors to the border lines unchanged, the autonomous vehicle can also move along the border line. The distance may be 10 cm. In this occasion the autonomous vehicles moves on the border line.

To make the moving path along the border line straighter and improve the moving efficiency, preferably, the control module but only monitors the intensities, but also the directions of the magnetic fields sensed by the two electric inductors, and keeps the directions of the magnetic fields sensed by the two electric inductors opposite and intensities equal. In this way, the distances from the two electric inductors to the border lines 13 are kept equal, realizing that the robot mower 11 moves along the straight line. When the moving direction of the robot mower 11 deviates from the extension direction of the border line 13, the intensities of the magnetic fields sensed by the two electric inductors become different, and the robot mower 11 correspondingly rotates slightly towards the direction where the intensities of the magnetic fields sensed by the two electric inductors are identical, so the magnetic fields sensed by the two electric inductors are kept identical in intensity and opposite in direction.

After moving for a predetermined distance along the border line, the control module of the robot mower 11 orders the driving module to perform turning again to leave the border line 13 and move back into the limit. The turning direction towards the direction of the first turning, and the turning angle is smaller than or equal to 90 degrees.

The mentioned turning mode approximately has three steps: turning for the first time, moving along the border line, and turning for the second time. However, omitting the first step is also feasible, meaning that the robot mower 11 directly moves along the border line after colliding with the border line. The effect of the first turning is achieved by correcting the direction of moving along the border line.

The above mentioned specific turning and turning process are exemplary, and can have variations.

For example, the limit 2 may be a border or an obstacle. The border may be a lead with a current signal, a physical border, or other borders formed by acoustic and optical signals.

For another example, when judging collision with the border line or reaching a predetermined distance away from the limit 3, the included angle between the central axis 33 in the autonomous vehicle 1 and the limit 3 may be the border sensing elements 35 on the sides in this embodiment, the GPS navigation system or other feasible systems.

For another example, the way of moving along the border line may move across the border line in this embodiment, or move for a predetermined distance against the border line. The predetermined distance for moving along the border line is preferably 20-100 cm in this embodiment, but can be correspondingly according to the working property of the autonomous vehicle 1 and the size, shape and features of the map, or freely set by the operator.

Through moving for a distance along the border line 13 and leaving the border line along the original direction, the autonomous vehicle 1 further improves the efficiency of leaving the narrow areas. As shown in FIG. 8 and FIG. 9, the turning times and moving distance for leaving the narrow area are smaller in the mode of moving along the border line first and then perform turning.

The invention claimed is:

1. An autonomous vehicle comprising:
   a housing having a central axis;
   a driving module comprising a motor;
   a limit detection module for detecting a location relationship between the autonomous vehicle and a limit; and
   a control module electrically connected with the driving module and the limit detection module,
   wherein the control module receives a signal from the limit detection module when a predetermined location relationship between the autonomous vehicle and the limit is detected,
   wherein in response to the signal the control module determines a direction of a turn for the autonomous vehicle to turn from the limit and then drives the driving module to turn the autonomous vehicle in the direction of the turn,
   wherein, when the turn begins, an acute angle is formed, on a first side of the autonomous vehicle closest to the limit, between the central axis of the autonomous vehicle and the limit, and
   wherein, when the turn is completed, an acute angle or a right angle is always formed, on said first side of the autonomous vehicle, between the central axis of the autonomous vehicle and the limit.

2. The autonomous vehicle of claim 1, wherein a turning angle of the turn is less than 180 degrees, and greater than or equal to 90 degrees.

3. The autonomous vehicle of claim 1, wherein the limit detection module comprises two sensors, and
   wherein each of the two sensors of the limit detection module independently comprises one of a far infrared ray sensor, an ultrasonic wave sensor, a collision sensor, a magnetic sensor, and a camera.

4. The autonomous vehicle of claim 1, wherein the limit detection module comprises two sensors, and
   wherein the two sensors are located on a front portion of the housing.

5. The autonomous vehicle of claim 1, wherein the limit detection module comprises two sensors, and
   wherein the two sensors are arranged symmetrically with respect to the central axis.

6. The autonomous vehicle of claim 1, wherein the limit detection module comprises two sensors and wherein the predetermined location relationship is detected when at least one of the two sensors reaches a predetermined distance from the limit.

7. The autonomous vehicle of claim 1, wherein the limit detection module comprises two sensors and wherein the control module determines which side the central axis of the housing forms an acute angle with the limit based on which of the two sensors first detects the predetermined location relationship.

8. The autonomous vehicle of claim 7, wherein the control module determines a value of an angle of incidence the central axis of the housing forms with the limit once the predetermined location relationship has been detected.

9. The autonomous vehicle of claim 8, wherein the value of the angle of incidence is determined based on a distance traveled by the autonomous vehicle from when a first of the two sensors reaches the predetermined distance from the limit to when a second of the two sensors reaches the predetermined distance from the limit.

10. The autonomous vehicle of claim 9, wherein the control module determines a turning angle for the autonomous vehicle based on the angle of incidence.

11. The autonomous vehicle of claim 1, wherein the limit detection module comprises two sensors and wherein the predetermined location relationship is detected when one of the two sensors is outside of the limit.

12. The autonomous vehicle of claim 11, wherein the control module determines which side the central axis of the housing forms an acute angle with the limit based on which of the two sensors first detects the predetermined location relationship.

13. The autonomous vehicle of claim 1, wherein the autonomous vehicle is a robot mower further comprising a cutting blade below the housing and a cutting motor for driving the cutting blade.

14. The autonomous vehicle of claim 13, further comprising:
    multiple cutting blades.

15. The autonomous vehicle of claim 1, wherein the driving module further comprises two motors and a wheel set comprising two wheels.

16. The autonomous vehicle of claim 15, wherein one of the two motors is capable of independently driving one wheel of the wheel set, and another of the two motors is capable of independently drive another wheel of the wheel set.

17. The autonomous vehicle of claim 1, wherein the limit detection module comprises two sensors and further comprising:
    a third sensor,
    wherein the third sensor is an obstacle sensor.

18. The autonomous vehicle of claim 1, further comprising:
    a battery.

19. The autonomous vehicle of claim 18, wherein the battery is a rechargeable battery located in the housing and connected to a charging electrode, the charging electrode located at a front part of the housing and exposed from the housing for docking.

20. The autonomous vehicle of claim 1, wherein the control module drives the driving module to cause the autonomous vehicle to follow the turn while traveling that re-directs the autonomous vehicle inside a working area defined by the limit when the autonomous vehicle reaches the limit.

* * * * *